(12) United States Patent
Khan et al.

(10) Patent No.: US 10,988,489 B2
(45) Date of Patent: Apr. 27, 2021

(54) ORGANOBORANES USEFUL AS ELECTROLYTES FOR LITHIUM BATTERIES

(71) Applicant: Clark Atlanta University, Atlanta, GA (US)

(72) Inventors: Ishrat Khan, Marietta, GA (US); Ahmed Alzharani, Glen Allen, VA (US); Amal Al-abdulrahman, Atlanta, GA (US); Rasha Alshahrani, Abha (SA)

(73) Assignee: Clark Atlanta University, Atlanta, GA (US)

( * ) Notice: Subject to any disclaimer, the term of this patent is extended or adjusted under 35 U.S.C. 154(b) by 163 days.

(21) Appl. No.: 16/201,121

(22) Filed: Nov. 27, 2018

(65) Prior Publication Data
US 2020/0165271 A1 May 28, 2020

(51) Int. Cl.
*C07F 5/02* (2006.01)
*H01M 10/0568* (2010.01)
(Continued)

(52) U.S. Cl.
CPC ......... *C07F 5/027* (2013.01); *H01M 10/0525* (2013.01); *H01M 10/0567* (2013.01);
(Continued)

(58) Field of Classification Search
CPC . C01B 35/00; C07F 5/02; C07F 5/027; H01B 1/00; H01M 4/9008;
(Continued)

(56) References Cited

U.S. PATENT DOCUMENTS

| 2006/0045866 A1* | 3/2006 | Chappelow | .......... C08G 65/329 |
| | | | 424/78.38 |
| 2010/0041160 A1* | 2/2010 | Chappelow | ............ C08G 65/30 |
| | | | 436/85 |

(Continued)

OTHER PUBLICATIONS

Alsharani, R., Liquid Organic Electrolytes: Blends of Low Molecular Weight Methoxyoligooxyethyleneglycol (MPEGs)/LiTFSI Salt. 2017, Master's Thesis. Clark Atlanta University. Atlanta, Georgia.*

(Continued)

*Primary Examiner* — Milton I Cano
*Assistant Examiner* — Suphia Quraishi
(74) *Attorney, Agent, or Firm* — Alston & Bird LLP

(57) ABSTRACT

Disclosed are novel organoborane compositions of Formula (I), (II) or (III),

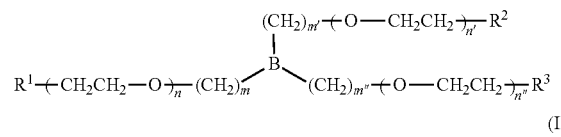

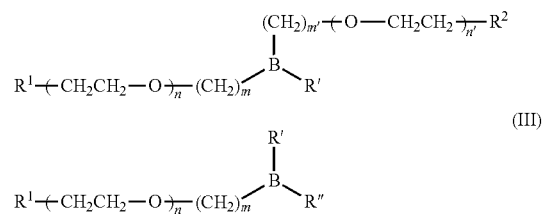

wherein $R^1$, $R^2$, $R^3$, $R'$, $R''$, $n$, $n'$, $n''$, $m$, $m'$, and $m''$ are defined hereinabove. Also disclosed is a method of using (Continued)

said compositions for electrolytic media in lithium rechargeable batteries, including lithium-ion or lithium-air rechargeable batteries. Also disclosed are compositions containing said Formula (I), (II) and (III) compounds with lithium salts, useful as electrolytic media or matrices.

6 Claims, 3 Drawing Sheets

(51) Int. Cl.
  H01M 10/0567 (2010.01)
  H01M 12/08 (2006.01)
  H01M 12/02 (2006.01)
  H01M 10/0525 (2010.01)
  C01B 35/00 (2006.01)
  H01B 1/00 (2006.01)
(52) U.S. Cl.
  CPC ....... *H01M 10/0568* (2013.01); *H01M 12/02* (2013.01); *H01M 12/08* (2013.01); *C01B 35/00* (2013.01); *C07F 5/02* (2013.01); *H01B 1/00* (2013.01); *H01M 2220/20* (2013.01); *H01M 2300/0025* (2013.01)
(58) Field of Classification Search
  CPC ......... H01M 10/0525; H01M 10/0567; H01M 10/0568; H01M 12/02; H01M 12/08; H01M 2220/20; H01M 2300/0025
  USPC .......................................... 429/188
  See application file for complete search history.

(56) References Cited

U.S. PATENT DOCUMENTS

| | | | |
|---|---|---|---|
| 2011/0230441 A1* | 9/2011 | Soppimath | A61K 47/10 514/64 |
| 2011/0294003 A1* | 12/2011 | Zhang | H01M 10/0567 429/199 |
| 2014/0113203 A1* | 4/2014 | Xiao | C07F 5/027 429/332 |
| 2015/0307638 A1 | 10/2015 | Nunoshige et al. | |
| 2016/0056502 A1* | 2/2016 | Kim | H01M 10/0565 429/314 |
| 2016/0327430 A1 | 11/2016 | Presser et al. | |
| 2017/0179499 A1* | 6/2017 | Ashley | C07F 5/027 |
| 2017/0365855 A1 | 12/2017 | Ryu et al. | |
| 2018/0006237 A1* | 1/2018 | Anemain | C07D 495/04 |
| 2018/0327430 A1* | 11/2018 | Chauvier | C07F 5/025 |

OTHER PUBLICATIONS

Zhao, H. Glymes a Versatile Solvents for Chemical Reactions and Processes: from the Laboratory to Industry. Dec. 18, 2013, RSC Advances. 2014,4,11251-11287.*
International Search Report for PCT/US2019/059222 (ISA/US) dated Feb. 14, 2020, (4 pages).
Written Opinion for PCT/US2018/059222 (ISA/US) dated Feb. 14, 2020, (4 pages).
K. M. Abraham and Z. Jiang, "A Polymer Electrolyte-Based Rechargeable Lithium/Oxygen Battery", Electrochemical Science and Technology, Jan. 1996, J. Electrochem. Soc., vol. 143, No. 1, pp. 1-5.
Mary Anne Mehta and Tatsuo Fujinami, "Li+ Transference Number Enhancement in Polymer Electrolytes by Incorporation of Anion Trapping Boroxine Rings into the Polymer Host", Chemistry Letters 1997, May 28, 1997, Department of Materials Science, Faculty of Engineering, Shizuoka University, Hammamatsu 432, pp. 915-916.
H. S. Lee, X. Q. Yang, C. L. Xiang, J. McBreen and L. S. Choi, "The Synthesis of a New Family of Boron-Based Anion Receptors and the Study of Their Effect on Ion Pair Dissociation and Conductivity of Lithium Salts in Nonaqueous Solutions", Brookhaven National Laboratory, Upton, New York 11973, USA, Naval Research Laboratory, Washington, DC 203 75-5320, USA, pp. 2813-2818.
G. Girishkumar, B. McCloskey, A. C. Luntz, S. Swanson and W. Wilcke, "Lithium-Air Battery: Promise and Challenges", The Journal of Physical Chemical Letters, IBM Research—San Jose, California, pp. 2193-2203.
Zhigang Xue, A Dan Heb and Xiaolin Xie, "Poly(ethylene oxide)-based electrolytes for lithium-ion batteries", Journal of Materials Chemistry A, pp. 1-33.
Ito, I.; Kanehori, K.; Kudo, T., "Ionic conductivity of electrolytes formed from PEO-LiCF3SO3 complex with low molecular weight poly (ethylene glycol)", Journal of Materials Science 1987, 22, 1845-1849.
Yuki Kato, S. Yokoyama, Hiromasa Ikuta, Yoshiharu Uchimoto, Masataka Wakihara, "Thermally stable polymer electrolyte plasticized with PEG-borate ester for lithium secondary battery", Electrochemistry Communications 2001, 3, 128-130.
J. Read, (2002) "Characterization of the lithium/oxygen organic electrolyte battery", J. Electrochem. Soc. 149(9):A1190-A1195.
Meyer, Wolfgang. H., "Polymer Electrolytes for Lithium-Ion Batteries", Adv. Mater. 1998, 10, 439-448.
D. Fish, I. Khan, J. Smid, Conductivity of solid complexes of lithium perchlorate with poly[ωmethoxyhexa (oxyethylene)ethoxy]methylsiloxane, Makromol. Chem., Rapid Commun., 1986, 7, 115-120.
Albert S. Lee, Jin Hong Lee, Soon Man Hong, Jong-Chan Lee, Seung Sang Hwang and Chong Min Koo, "Boronic ionogel electrolytes to improve lithium transport for Li-ion batteries", Electrochimica Acta 215 (2016) 36-41.
Jonathan Hines, Communications, "Researchers Flip Script for Li-Ion Electrolytes to Simulate Better Batteries, Caltech researchers run simulations to find stable, fast electrolytes for lithium-ion batteries", Jan. 31, 2017, https://www.oml.gov/news/researchers-flip-script-li-ion-electrolytes-simulate-better-batteries, pp. 1-8.
Vyacheslav S. Bryantsev, Mario Blanco and Francesco Faglioni, "Stability of Lithium Superoxide LiO2 in the Gas Phase: Computational Study of Dimerization and Disproportionation Reactions", J. Phys. Chem. A 2010, 114, 8165-8169.
Cormac O. Laoire, Sanjeev Mukerjee and K. M. Abraham, "Elucidating the Mechanism of Oxygen Reduction for Lithium-Air Battery Applications", Department of Chemistry and Chemical Biology, Northeastern University, 360 Huntington Avenue, Boston, Massachusetts 02115, J. Phys. Chem. C 2009, 113, 20127-20134.
Weidong Zhang, Houlong L. Zhuang, Lei Fan, Lina Gao and Yingying Lu, "A "cation-anion regulation" synergistic anode host for dendrite-free lithium metal batteries", Sci. Adv. 2018;4: eaar4410, Feb. 23, 2018, pp. 1-8.

* cited by examiner

ORGANOBORANES USEFUL AS ELECTROLYTES FOR LITHIUM BATTERIES

STATEMENT REGARDING FEDERALLY SPONSORED RESEARCH OR DEVELOPMENT

Development of the invention described herein was at least partially funded with government support through NSF CREST HRD-1137751 grant awarded by the National Science Foundation. The U.S. government has certain rights in the invention.

BACKGROUND

The ever-growing electric transportation market, including hybrid electric vehicles (HEVs) and plugin hybrid electric vehicles (PHEVs), have provided major impetus for the development of higher energy density storage devices to power such vehicles. Light weight i.e., high energy density solvent-free batteries have regained much attention.

Batteries provide power to an external load through the chemical oxidation of a substance, e.g., Lithium, which prompts a loss of electrons from an anode through a load to the cathode contains a species that is reduced, e.g., oxygen in Lithium-Air batteries. Directly related to the performance of a battery is the efficiency of the ionic species formed during this redox process to easily move (diffuse) internally within the battery, typically through electrolytes or a membrane separator. Rechargeable batteries also require the reverse process to occur. This reverse process is also dependent on the ease with which ions may flow within the battery.

Solvent-free batteries have been developed that employ polymer-based and/or gelled electrolytes in place of liquid solvents, so called wet cells, used to dissolve ions in a battery [Meyer, W. H., Polymer Electrolytes for Lithium-Ion Batteries, Adv. Mater. 1998, 10, 439]. In contrast to wet-cell batteries, these polymeric electrolytes are safer to use and may be processed into thin films to provide multiple cells in a battery. The most common polymeric electrolyte contains ethylene oxide (CH2CH2O) groups which form poly(ethylene oxide) (PEO). The PEO electrolyte may be present in amorphous or crystalline phase. The PEO electrolyte is capable of solvating lithium cations through ion-dipole and Van der Waals interactions.

It has been established that ion diffusion is faster within an amorphous PEO domain compared to a crystalline PEO domain. In amorphous domains, segmental motion facilitates the ion transport [D. Fish, I. Khan, J. Smid, Conductivity of solid complexes of lithium perchlorate with poly[ωmethoxyhexa(oxyethylene)ethoxy]methylsiloxane, Makromol. Chem., Rapid Commun., 1986, 7, 115.]

An emerging battery design is the Lithium-Air battery, in which the cathode utilizes ambient oxygen to effect reduction. Read et al. reported the effects of air cathode formulation and electrolyte composition on the discharge capacity, rate capability, and rechargeability of lithium/oxygen batteries [Read J. (2002) Characterization of the lithium/oxygen organic electrolyte battery, J. Electrochem. Soc. 149(9): A1190-A1195]. To characterize the effects of cell formulation on the discharge reaction, various analytical techniques were used including static and dynamic gas consumption measurements and scanning electron microscopy. Read et al. found that in certain electrolytes such as 1 M LiPF6 in propylene carbonate (PC:THF), the main discharge product is Li2O2, whereas in other electrolytes based on mixed carbonate solvents, the discharge product was mainly Li2O. Read et al. also measured both oxygen solubility in the electrolyte and viscosity of the electrolyte to demonstrate how oxygen partial pressure affects cell performance as it changes the concentration of oxygen in the electrolyte; concluding that higher concentrations of oxygen in the electrolyte and low discharge rates appeared to favor the formation of Li2 O2. Thus, it would be advantageous to discover novel electrolyte compositions that promote Li2O2 for use in Li-ion and Li-air batteries.

SUMMARY

Provided herein are novel organoborane compositions. The compositions are useful in electrolytic media or matrices such as those used in lithium rechargeable batteries, specifically lithium-ion or lithium-air rechargeable batteries. Organoborane compositions disclosed herein enhance the performance of electrolytes when used in lithium-air and/or lithium-ion batteries. The organoborane compositions of the present invention facilitate the dissolution of other added salts such as LiTFSI, which changes the ion-pairing and slows down anion transport within the cell, resulting in increased ionic conductance. The increase in ionic conductance suggests that a majority of the charge carriers are the cations. Therefore, the organoborane electrolytes provided herein, when used with added LiTFSI salts, help to increase the effectiveness of lithium rechargeable batteries as a result of observed higher ionic conductivities. The organoborane structures described herein also optimize (lower) the level of charge voltage required by the battery during recharging, thereby further increasing battery life.

In one embodiment, the organoborane composition comprises the compound of Formula (I)

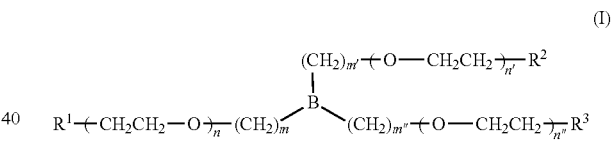

wherein
$R^1$, $R^2$, and $R^3$ are independently selected from H, $C_1$-$C_3$ alkyl, allyl, cyano, amino, hydroxyl, —$CO_2H$, —$CO_2R'''$ and —$OCOOR'''$;
m, m' and m" are integers, each independently selected from 3 to 100;
n, n', and n" are integers, each independently selected from 1 to 100; and
R''' is $C_1$-$C_6$ alkyl or aryl.

Additional advantages will be set forth, in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below. Like numbers represent the same elements throughout the figures. The drawing figures are not necessarily to scale and certain features may be shown exaggerated in scale or in a somewhat generalized or schematic form in the interest of clarity and conciseness. For more complete understanding of the features and advantages of the present invention, reference is now made to the detailed description of the invention along with the accompanying figures, wherein.

DETAILED DESCRIPTION

In one aspect described herein are organoborane compounds having the Formula (I):

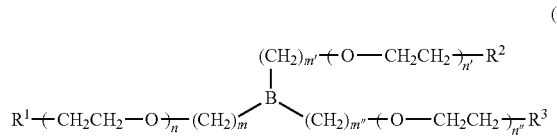

wherein
$R^1$, $R^2$, $R^3$ are independently selected from H, $C_1$-$C_3$ alkyl, allyl, cyano, amino, hydroxyl, —$CO_2H$, —$CO_2R'''$ and —$OCOOR'''$;
m, m' and m" are integers, each independently selected from 3 to 100;
n, n', and n" are integers, each independently selected from 1 to 100; and
R''' is $C_1$-$C_6$ alkyl or aryl.

In a second aspect described herein are organoborane compounds of Formula (II):

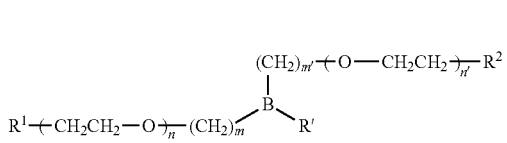

wherein
$R^1$ and $R^2$ are independently selected from H, $C_1$-$C_3$ alkyl, allyl, cyano, amino, hydroxyl, —$CO_2H$, —$CO_2R'''$ and —$OCOOR'''$;
R' and R''' are $C_1$-$C_6$ alkyl or aryl;
m and m' are integers, each independently selected from 3 to 100; and
n and n' are integers, each independently selected from 1 to 100.

In a third aspect described herein are organoborane compounds of Formula (III):

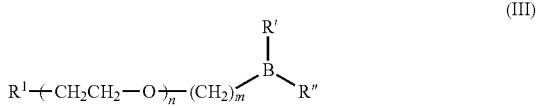

wherein
$R^1$ is selected from H, $C_1$-$C_3$ alkyl, allyl, cyano, amino, hydroxyl, —$CO_2H$, —$CO_2R'''$, and —$OCOOR'''$;
R', R", and R''' are $C_1$-$C_6$ alkyl or aryl;
m is an integer independently selected from 3 to 100; and
n is an integer independently selected from 1 to 100.

Compounds of Formula (I), (II) or (III) are useful in electrolytic media or matrices for lithium-air or lithium-ion batteries.

Figure 1:
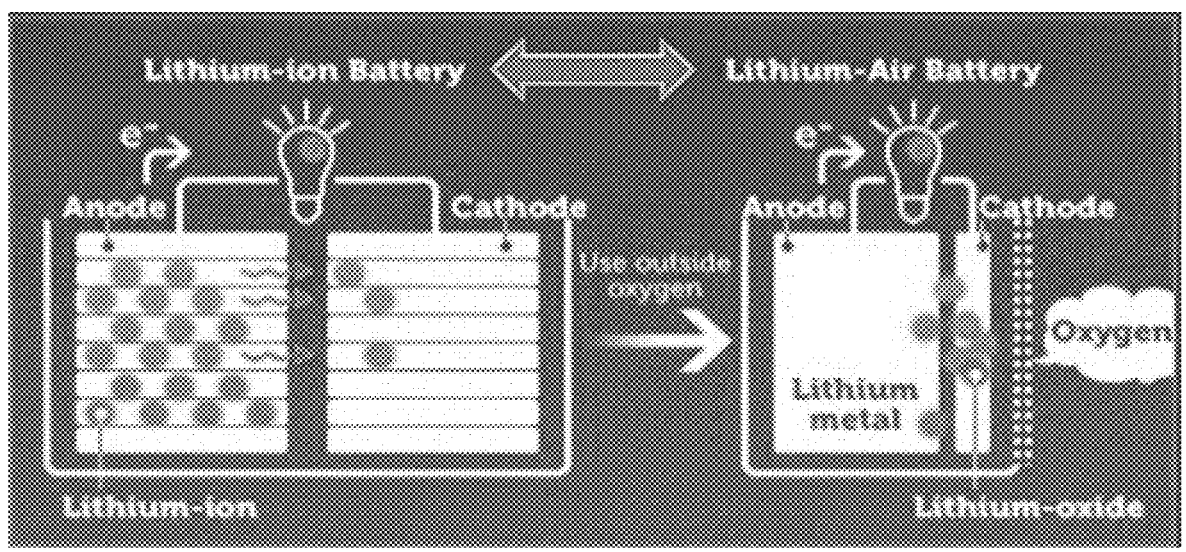
FIG. 1 is a schematic drawing depicting the features and differences two kinds of batteries: Lithium Ion and Lithium Air, showing the flow of electrons from the anode to the cathode via an external circuit, and the flow of electrolyte internally from the anode through a membrane to the cathode.
Figure 2:
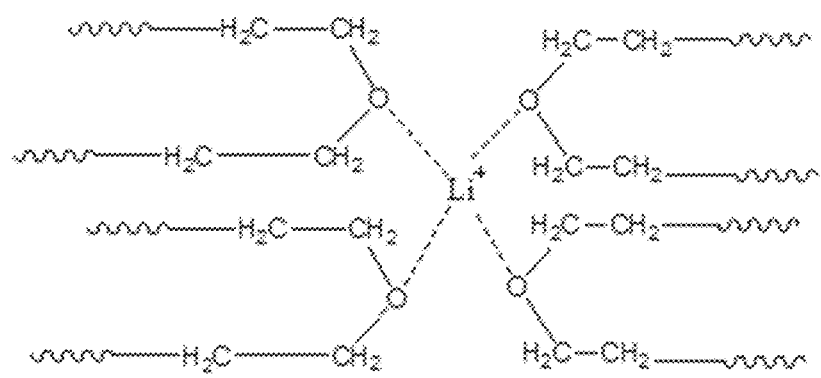
FIG. 2 is an illustration of the complexation of Li ions with organoborane polyether compounds.

Lithium-air and lithium-ion batteries are high density energy storage devices. FIG. 1 shows the difference between the two types of batteries. A lithium-ion battery is composed of a positive electrode, a negative electrode, and a solid-state organic electrolyte, i.e., a salt suspended in a polymeric matrix. A lithium-air battery is composed of an anode, a liquid electrolyte, as well as oxygen gas which act as a cathode as shown in FIG. 1.

An electrolytic medium acts as the pathway for conduction of lithium ions between the two electrodes. The difference between lithium-ion battery and lithium-air battery lies in the type of the electrolytic media used and the cathode material. The lithium-air battery uses oxygen gas as the cathode whereas the lithium-ion battery uses an intercalated lithium compound as the cathode. Both of these batteries can be recharged and thus serve as secondary batteries. The electrolytic media in both batteries are normally organic materials which are good media to promote lithium ion movement and are electrical insulators i.e., inhibit electron movement. Preferred electrolytic media should be suitable for possible fabrication into thin films, non-volatile and non-flammable, and thus safe and easy to use in battery manufacture.

The cathode, anode, and electrolyte are used to convert chemical energy into electrical energy. The reaction is called oxidation-reduction. The reaction is reversible, especially when the voltage is applied to the battery. An oxidation reaction takes place at the negative electrode during discharge of lithium batteries [Li0→Li++e−]. During discharging, the positively charged ions that are produced tend to move towards the positive electrode while the electrons move towards the positive electrode via the external circuit. The positive electrode is the site where reduction takes place. In contrast, the oxidation-reduction takes place in the reverse direction during the charging process.

In another aspect of the invention there are provided mixtures of organoborane compounds with electrolytic salts, including lithium bis-trifluoromethane sulfonimide (LiTSFI). The organoborane compounds, together with the electrolytic salts dissolved in them, (LiTFSI or LiClO4), form polymer-based electrolytic media or matrices which have utility not only in solid-state, rechargeable lithium-ion and lithium-air batteries, but also in supercapacitors.

LiTSFI (CAS NO. 90076-65-6) has excellent electrochemical properties, as well as high thermal and chemical stability. The stability enhances its safety, as well as performance during its applications in areas such as electrical vehicles, flat panel screens, power tools, laptop, e-bikes, and smartphones. This salt is a key component in liquid or solid electrolytes for Li-ion batteries. LiTFSI can be commercially obtained (e.g., Sigma-Aldrich) in the pure form, i.e. purity of 99.99%. It has a melting point of 234-238° C. It is white or light in color, and generally exists either as a powder or as crystals. Use of LiTFSI with modified poly (ethylene oxide) has resulted in high battery performance, high intrinsic safety, reduced battery cost, reduced battery filling time, and has no aluminum corrosion. LiTFSI salt has a larger anion group, i.e. a soft anion, that is, TFSI-. The size of TFSI-group greatly affects the ionic conductivity of the salt because this larger anion results in decreased anion-cation interactions and thus has more free ions and solvent separated ion-pairs as opposed to triple anions, quadrupoles or higher aggregates that decrease ionic conductivity.

Conductivity of LiTFSI Mixture Combined with Organoboranes

Boron compounds behave as anion receptors via Lewis acid-base interactions. As such, boron compounds have the potential to decrease ionic aggregation in a lithium ion battery, resulting in an increase in ionic conductivity. Lee has reported on the increased ionic conductance, increased mobility of the cation and decreased mobility of the anion in polymer electrolytes containing a boron additive [H. S. Lee, X. Q. Yang, C. L. Xiang, and J. McBreen, The Synthesis of a New Family of Boron-Based Anion Receptors and the Study of Their Effect on Ion Pair Dissociation and Conductivity of Lithium Salts in Nonaqueous Solutions. J. Electrochem. Soc. 1998, 145, 2813]. It has also been reported that addition of low molecular weight polyethylene glycol (MPEG) plasticizes the PEO matrix and increases ionic conductivities [Ito, I.; Kanehori, K.; Miyauchi, K.; Kudo, T. Ionic conductivity of electrolytes formed from PEO-LiCF3SO3 complex with low molecular weight poly (ethylene glycol), Journal of Materials Science 1987, 22, 1845-1849]. Mehta et al. reports a method for enhancing the Li+ transfer number by incorporating boroxine ring groups into the polymer host [M. A. Mehta; T. Fujinami; T. F., Li+ Transference Number Enhancement in Polymer Electrolytes by Incorporation of Anion Trapping Boroxine Rings into the Polymer Host, Chemistry Letters 1997, 9,5]. Wakihara et al. reported a polymer electrolyte in the presence of a PEG-borate ester (PEGBE) plasticizer, PEGMA monomer, PEGDMA crosslinker and LiTFSI salt. The PEG-borate ester showed good thermal stability and high ionic conductivity around 1.9×10-4 S cm-1 at 30° C. and 2.0×10-3 at 60° C. respectively [Yuki Kato, S. Yokoyama, Hiromasa Ikuta, Yoshiharu Uchimoto, Masataka Wakihara, Thermally stable polymer electrolyte plasticized with PEG-borate ester for lithium secondary battery Electrochemistry Communications 2001, 3, 128-130]. Borate ether polymers containing EO side chains can be applied as liquid electrolytes and blended with PEO-based electrolytes. The blended polymer electrolytes showed higher ionic conductivity and much higher Li+ transfer numbers than PEO-LiX systems [Xue, Z.; He, D.; Xie, X., Poly(ethylene oxide)-based electrolytes for lithium-ion batteries, J. Mater. Chem. A 2015, 3, 19218-19253]. This apparently increases the ionic conductivity by altering the morphology and/or the ion-pairing of the salts in the matrix.

Disclosed herein are novel organoborane polymeric structures of Formula (I), (II) and (III) which, when incorporated with various salts such as LiTFSI, result in a novel electrolytic medium useful in lithium-ion and lithium-air batteries. The disclosed compounds show enhanced ionic conductivity properties. Without being bound by theory, the enhanced conductivity is likely due to the boron atom, a strong Lewis acid, which interacts with the TFSI-anion and increases the interionic distance between the anion and the cation associated with the oxygen atoms of the polyethylene glycol. The result is an increase in free or polymer-separated cations and thus increased mobility or conductance is observed at a lower salt content.

Definitions

In this specification and in the claims, which follow, reference will be made to a number of terms which shall be defined to have the following meanings:

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

"Optional" or "optionally" means that the subsequently described event or circumstance can or cannot occur, and that the description includes instances where the event or circumstance occurs and instances where it does not. For example, the phrase "optionally substituted lower alkyl" means that the lower alkyl group can or cannot be substituted and that the description includes both unsubstituted lower alkyl and lower alkyl where there is substitution.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a ligand refers to one or more —[CH2CH2O]— units in the ligand, regardless of whether ethylene glycol was used to prepare the ligand.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group may be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Examples include vinyl, allyl, methallyl, and the like.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "silyl group" as used herein is represented by the formula —SiRR'R", where R, R', and R" can independently be a hydrogen, alkyl, alkenyl, alkynyl, aryl, aralkyl, cycloalkyl, halogenated alkyl, alkoxy, or heterocycloalkyl group as described above.

The compounds represented by Formula (I), (II) and (III) can be optically active or racemic, have cis and trans isomers. Optical activity and cis/trans isomers may be characterized by Polarimetry and NMR spectroscopy, respectively.

Preparation of Organoborane Compounds

Described herein are methods for making compounds having the Formula (I), (II) and (III). The compounds having the Formula (I), (II) and (III) can be readily synthesized using techniques generally known to synthetic organic chemists, and illustrated by the General Schemes shown below. Unless specifically specified otherwise, R1 R2, R3 R', R", R'", n, n', n", m, m', and m" are as defined above.

Step 1: Preparation of Allylglymes

Allylglymes of the general structures of Formula (VI) shown below are synthesized by established synthetic techniques by the reaction shown below (Scheme 1).

Scheme 1

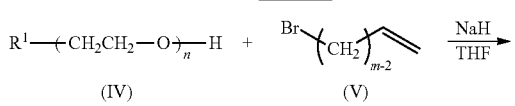

(IV)    (V)

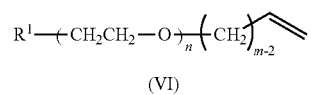

(VI)

Where m=3-100 n=1-100

R' is H, $C_1$-$C_3$ alkyl, allyl, cyano, amino, hydroxyl, $CO_2H$, $CO_2R'''$ or $OCOOR'''$, and R''' is $C_1$-$C_6$ alkyl or aryl.

In this Scheme, a hydroxy polyethylene glycol of the general structure (IV) is allowed to react with an alkenyl-alkyl bromide of general structure (V) using a strong base such as sodium hydride in an aprotic solvent such as THF. The product is an alkenyl polyethylene oxide of Formula (VI). The isolated product is carried on to the next step without purification.

Similarly, allylglymes of general structures (VII) and (VIII) are prepared in the same manner, from the corresponding hydroxy propylene glycol and alkenyl alkyl borane.

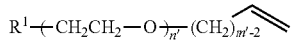

(VII)

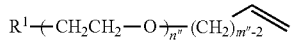

(VIII)

Step 2: Preparation of Organoboranes of Formula (I)

The preparation of Formula (I), compounds is generally depicted below in Scheme 2.

Scheme 2

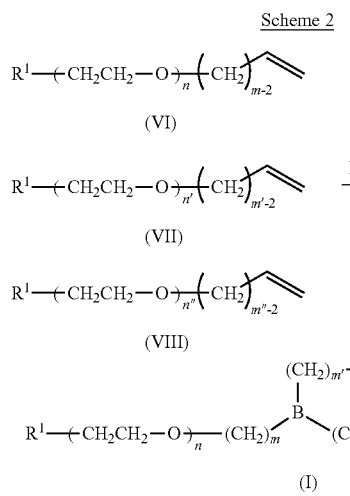

In this Scheme, a single alkenyl polyethylene oxide of Formula (VI) (3 equiv) or a mixture of alkenyl polyethylene oxides (Formulas (VI), (VII) and (VIII), which together amount to 3 equiv) are allowed to react with borane-THF complex under anhydrous conditions.

Preparation of Organoboranes of Formula (II)

By modification of the ratio of reactants to each other, a disubstituted organoborane of Formula (IX) produced in similar fashion as shown in Scheme 3.

Scheme 3

R$^1$—(CH$_2$CH$_2$—O)$_n$(CH$_2$)$_{m-2}$⟶

(VI)

R$^1$—(CH$_2$CH$_2$—O)$_{n'}$(CH$_2$)$_{m'-2}$⟶

(VII)

$\xrightarrow{\text{BH}_3\cdot\text{THF}}{\text{THF}}$

R$^1$—(CH$_2$CH$_2$—O)$_n$—(CH$_2$)$_m$—B(H)—(CH$_2$)$_{m'}$—(O—CH$_2$CH$_2$)$_{n'}$—R$^2$ (IX)

Thus two equivalents of individual or mixtures of compounds of Formula (VI) and Formula (VII) are allowed to react to provide the compound of Formula (IX).

Preparation of Organoboranes of Formula (X)

Similarly, reaction of 1 equiv of Formula (VI) with BH3 provides the compound of Formula (X) as shown in Scheme 4.

Scheme 4

R$^1$—(CH$_2$CH$_2$—O)$_n$(CH$_2$)$_{m-2}$⟶

1 equiv
(VI)

$\xrightarrow{\text{BH}_3\cdot\text{THF}}{\text{THF}}$

R$^1$—(CH$_2$CH$_2$—O)$_n$(CH$_2$)$_{m-2}$—BH$_2$ (X)

Alternatively, Formula (I), (IX) and (X) compounds can be prepared by the method illustrated in Scheme 5.

Scheme 5

R$^1$—(CH$_2$CH$_2$—O)$_n$(CH$_2$)$_{m-2}$⟶

(VI)

$\xrightarrow{\text{BH}_3\cdot\text{THF}}{\text{THF}}$

R$^1$—(CH$_2$CH$_2$—O)$_n$—(CH$_2$)$_m$—BH$_2$ (X)

R$^1$—(CH$_2$CH$_2$—O)$_{n'}$(CH$_2$)$_{m'-2}$⟶

(VII)

R$^1$—(CH$_2$CH$_2$—O)$_n$—(CH$_2$)$_m$—B(H)—(CH$_2$)$_{m'}$—(O—CH$_2$CH$_2$)$_{n'}$—R$^2$ (IX)

R$^1$—(CH$_2$CH$_2$—O)$_{n''}$(CH$_2$)$_{m''-2}$⟶

(VIII)

R$^1$—(CH$_2$CH$_2$—O)$_n$—(CH$_2$)$_m$—B[(CH$_2$)$_{m'}$—(O—CH$_2$CH$_2$)$_{n'}$—R$^2$][(CH$_2$)$_{m''}$—(O—CH$_2$CH$_2$)$_{n''}$—R$^3$]

(I)

The Formula (IX) or Formula (X) compounds, prepared by any of the above means can then be subjected to further alkylation with alkenyl groups to produce the organoboranes of Formula (II) or Formula (III), as illustrated in Scheme 6 below.

Lewis acid, interacts with the anion and increases the interionic distance between the anion and the cation. Increasing this distance likely results in greater number of free or polymer separated cations and thus increased mobility, or conductance is observed at lower salt content.

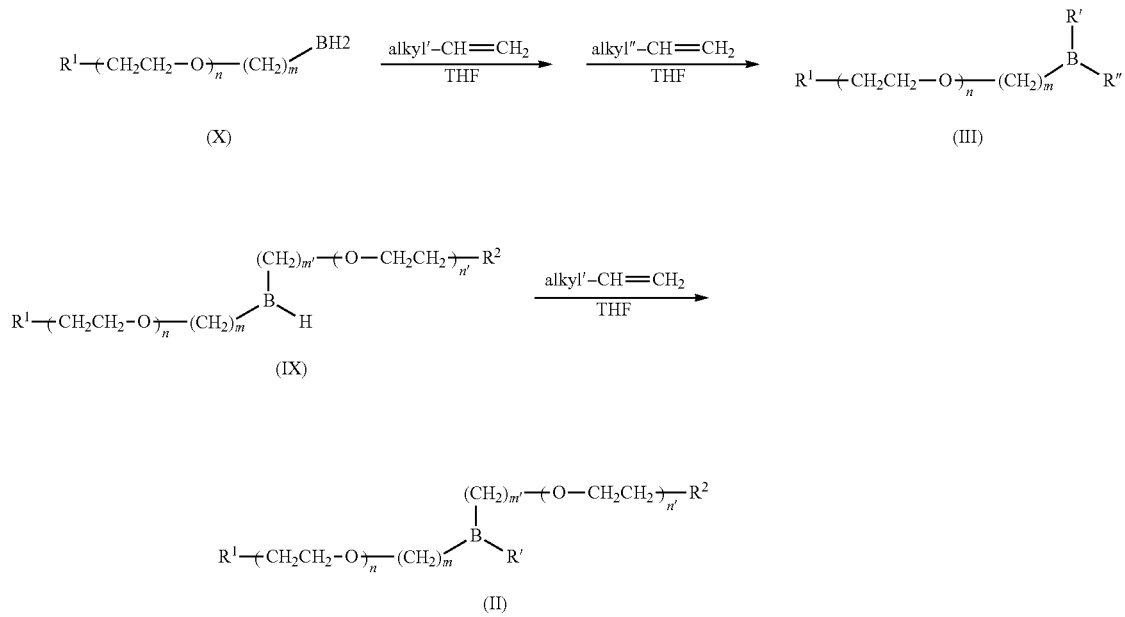

Specific example of compounds prepared by the above general methods are described in more detail in Examples below.

Utility of Formula (I), (II) and (III) Compounds as Battery Electrolytes

The organoboranes of Formula (I), (II) or (III) can be used in a matrix as electrolytic media in Li-ion or Li-air batteries, the latter potentially producing with an energy density in the range of 600-1,000 Wh/kg. [K. M. Abraham, Z. Jiang, A Polymer Electrolyte-Based Rechargeable Lithium/Oxygen Battery. Electrochemical Society 1996, 143, 1-5)] and [G. Girishkumar, B. M., A. C. Luntz, S. Swanson, W. Wilcke, Lithium-Air Battery: Promise and Challenges, The Journal Physical Chemistry Letters 2010, 1, 2193-2203]. This capacity level means that electronic devices have the potential to run five to ten times longer than the world's best lithium-ion batteries. It is anticipated that the use of the organoboranes of Formula (I), (II) or (III) will improve both the performance and stability of lithium-ion and lithium-air batteries.

The addition of Formula (I), (II) or (III) compounds to electrolytic media blends significantly increases the ionic conductivity as shown in Tables 1 and 2.

Without being bound by theory, it is believed that the borane additive affects the electrolytic properties and the behavior of the blend because the boron atom, a strong Interaction of the Compound of Formula (I) with LiTFSI

ABBREVIATIONS AND ACRONYMS

A the section area of the sample, as used in $\sigma = D/RA$
$BH_3$.THF borane-tetrahydrofuran complex
° C. degrees Celsius
$\delta$ NMR chemical shift relative to standard
D thickness of a sample
$e^-$ electron
$E_a$ Activation Energy
equiv equivalent(s)
EO ethylene oxide
FT-IR Fourier Transform Infrared Spectroscopy
g gram(s)
HEV hybrid electric vehicles
kj/mole kilojoules/mole
LiTFSI lithium bis-trifluoromethane sulfonimide
m multiplet
mAh/g milliampere Hour per Gram
MHz megahertz
mL milliliter(s)
MPEG(s) Methoxypolyethylene glycol or methoxoligooxyethylene glycol
MPEG 350 Methoxypolyethylene glycol with average molecular weight of 350
MPEG 550 Methoxypolyethylene glycol with average molecular weight of 550

MPEG 750 Methoxypolyethylene glycol with average molecular weight of 750
MW molecular weight
NMR nuclear resonance spectroscopy
PC propylene carbonate
PEO polyethylene oxide
PEO350 polyethylene oxide of MW of approximately 350 (MPEG 350)
PHEV Plug-in hybrid electric vehicles
R resistance
s singlet
σ Conductivity
S CM$^{-1}$ Siemens per cm
$T_g$ glass transition temperature
THF tetrahydrofuran
Wh kg$^{-1}$ Watt-hours per Kilogram

EXPERIMENTAL EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Materials

Methoxypolyethylene glycol or methoxoligooxyethylene glycol (MPEGs) (MW 350 and 550) were acquired from Sigma Aldrich Chemical Company and dried by freeze drying. Tetrahydrofuran (THF) was purchased from Sigma Aldrich Chemical Company and was purified by distillation from sodium and benzophenone just before use. Bis(trifluoromethane sulfonimide) lithium salt was acquired from Sigma Aldrich Chemical Company and dried in a vacuum oven just before use. Benzene was purchased from Fisher Chemical Company. Chloroform-D, (99.8%), for NMR was received from Acros Organics Company.

Instrumentation

A KEITHLEY 6430 was used to measure the resistance of the samples. Resistance of the samples were determined by the two-probe method under nitrogen gas at 25° C., 40° C., 60° C. and 70° C. The measurements were carried out both during the heating and cooling cycles. Each resistance measurements were repeated seven times. The sample was placed in a 5 mm NMR tube and a second smaller tube containing LiCl in D2O was placed into the 5 mm tube serving as an internal lock and an internal standard.

Representative allyl polyethylene glycol methyl ethers were prepared by direct allylation of the commercially available monomethyl ethers with molecular weights of 350 and 550 corresponding to approximately 8 and 12 ethylene oxide repeat units, respectively. Separation of the products from the starting materials was achieved by using standard laboratory procedures such as filtration and separation funnel. The desired products of the reaction were obtained as shown in Scheme 1 in reasonable yield. The $^1$H NMR, $^{13}$C NMR and IR spectra were consistent with expected product.

Example 1. Synthesis of Borane-Allyl Methoxypolyethylene Glycol (350) Compound 1

A specific synthesis for a Formula (I) compound where n is approximately 7-8, m=3, and R$^1$ is CH$_3$ (Compound 1) was carried out as follows:

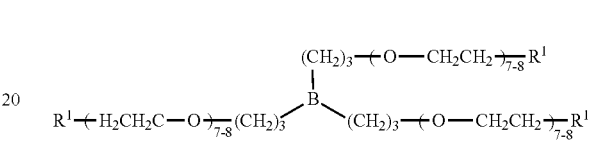

[Formula (I) where n = 7-8, m = 3, R$^1$ = CH$_3$]

Step 1

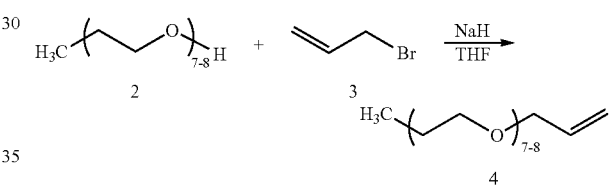

The allyl polyethylene glycol methyl ether 4 was prepared by direct allylation of the commercially available monomethyl ether 2 with molecular weight of 350 corresponding to approximately 7-8 ethylene oxide repeat units (MPEG 350). The allyloxy ether product was carried on to the next step without substantial purification.

Step 2

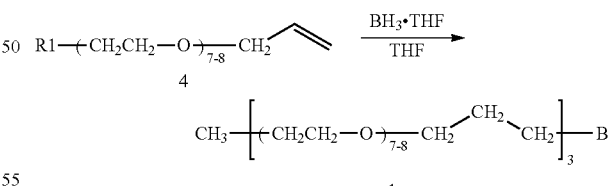

The reaction was carried out in a dry 250 mL of three-necked round bottom flask containing 5.86 g allyl(PEO-350) (15.02 mmol) 4 with dried 100 mL THF as solvent and equipped with a rubber septum and thermometer. The mixture was magnetically stirred under a N$_2$ atmosphere, then chilled to 0° C. in an ice-water bath. Borane-tetrahydrofuran solution 3.87 g (45.06 mmol) was added dropwise via syringe to the mixture, and stirring was continued for 10 to 20 min after the addition is complete. The cooling bath was then removed, and the reaction mixture allowed to stand for 3 hours at 20° C. to ensure complete reaction. The mixture was then filtered, and solvent evaporated to provide the desired product. The product exhibited the following spectral properties: $^1$H NMR (400 MHz, CDCl$_3$) δ0.135 (m, 2 H, BCH$_2$C), 1.54 (m, 2 H, BCCH2C, 3.31 (s, 3H, OCH$_3$), 3.32 (m, 2 H, BCCCH$_2$O), 3.51-3.56 (m, 32H, OCH$_2$CH$_2$O); $^{13}$C NMR (400 MHz, CDCl$_3$) δ: 13.72, 18.79, 58.98, 64.02, 67.92-70.49.

Figure 3:
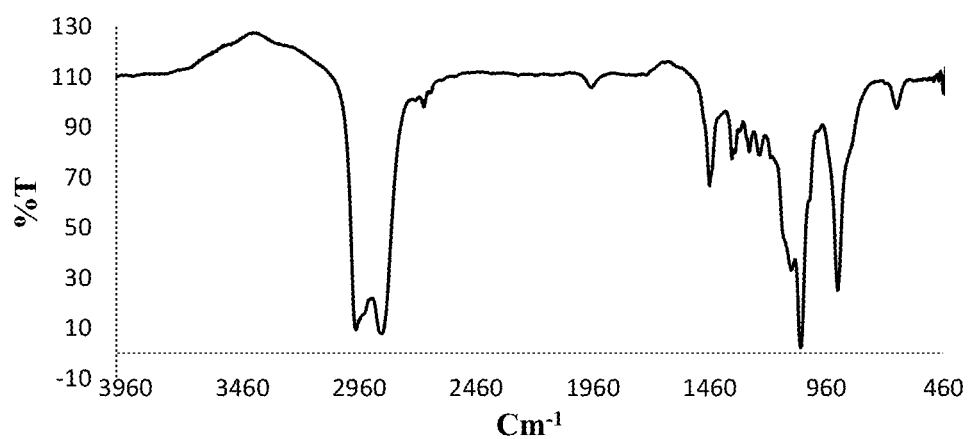
FIG. 3 shows the FT-IR spectra of the synthesized product Compound 1 (Formula I where n=n'=n''□7-8, m=m'=m''=3 and R=R'=R''=—CH3. In the spectrum of Compound 1, the peak at 1040 cm-1 is the bending stretch of the boron-carbon single bond (B—C.)

FIG. 3 shows the FT-IR spectra of the synthesized product Compound 1. In the spectrum of Compound 1, the peak at 1040 cm-1 is the bending stretch of B—C.

In analogous fashion, Borane-Allyl Methoxypolyethylene Glycol (550) Compound 5 was prepared starting with monomethyl ether (MPEG 550) 6.

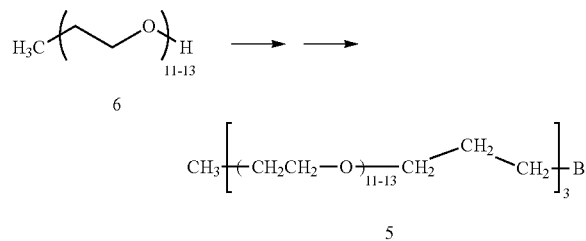

Example 2. Preparation of Borane-Allyl Methoxypolyethylene Glycols-LiTFSI Electrolyte Compositions

Method 1

Solutions of Compound 1 and Compound 5 were individually prepared in THF. Varying amounts of LiTFSI salt were then added to each in appropriate amounts, followed by stirring for 4 hours. The solvent was removed by evaporation under an N2 stream at room temperature. Each resulting composition of borane-glycol/LiTFSI was dried in a vacuum oven for at least 48 hours at 50° C.

Method 2

Appropriate amounts of Compound 1 and 5 and varying amounts of LiTFSI salt were each dissolved in 10 mL of THF, which was followed by stirring for 8 hours. The solvent was removed by evaporation under an N2 stream. The resulting compositions of borane-glycol/LiTFSI were dried for two days at 50° C.

After drying the compositions, conductivity was measured at four different temperatures of 25° C., 40° C., 55° C. and 70° C. as described below.

Example 3. Evaluation of Borane-Allyl Methoxypolyethylene Glycol (Compound 1/LiTFSI Compositions The ionic conductivity of the pure and blend systems of different compositions were determined at four temperatures of 25° C., 40° C., 55° C. and 70° C.

The resistance of the blends was measured using a two-probe setup at 25° C. In order to ensure reproducibility, the measurements were carried out during both heating and cooling cycles. Measurements were repeated eight times to ensure reproducibility. The conductivity, σ, was calculated using the following equation:

$$\sigma = D/AR$$

Where σ is conductivity, D is the thickness, R is the resistance, A is the section area of the sample.

The Compound 1/LiTFSI composition with an EO/Li$^+$ molar ratio of 35:1 shows a maximum ionic conductivity value of 2.14×10-3 S cm$^{-1}$ at 25° C., as shown in Table 3. The ionic conductivity increases with increasing temperature and shows that the ion transport is aided by the segmental motion of the polymer matrix host.

TABLE 3:

| Ionic Conductivity of Compound 1/LiTFSI Compositions | | | | |
| --- | --- | --- | --- | --- |
| EO/Li$^+$ (molar ratio) | σ (S cm$^{-1}$) at 25° C. | σ (S cm$^{-1}$) at 40° C. | σ (S cm$^{-1}$) at 55° C. | σ (S cm$^{-1}$) at 70° C. |
| 5:1 | 1.04 × 10$^{-3}$ | 1.17 × 10$^{-3}$ | 1.32 × 10$^{-3}$ | 1.52 × 10$^{-3}$ |
| 15:1 | 1.42 × 10$^{-3}$ | 1.45 × 10$^{-3}$ | 1.47 × 10$^{-3}$ | 1.71 × 10$^{-3}$ |
| 25:1 | 1.61 × 10$^{-3}$ | 1.75 × 10$^{-3}$ | 1.87 × 10$^{-3}$ | 1.91 × 10$^{-3}$ |
| 35:1 | 2.14 × 10$^{-3}$ | 2.46 × 10$^{-3}$ | 3.44 × 10$^{-3}$ | 3.90 × 10$^{-3}$ |

Compound 1 (Formula I, where m, m', and m''=3; n, n', and n''=7-8; and R$^1$, R$^2$, and R$^3$ are methyl)/LiTFSI blend shows high ionic conductivity around 10$^{-3}$ S cm$^{-1}$ at ambient temperature. Table 3 shows the ionic conductivity of compositions of various ratios of Compound 1/LiTFSI. It is believed that Compound 1/LiTFSI compositions have higher ionic conductivity relative to non-boron containing polymers, because the boron atom, which is a strong Lewis acid, interacts with the anion and increases the interionic distance between the anion and the cation. This may result in higher transfer numbers for the cations and/or formation of polymer separated cations and thus increased mobility of the ions in the polymer matrix resulting in increased ionic conductivity.

Example 4. Evaluation of Blends of Compound 1 with LiTFSI and MPEGs

Blends of Compound 1 with LiTFSI and Methoxypolyethylene glycols were prepared by simple mixing provide homogenous liquids with properties as shown in Tables 4 and 5. Addition of 10% or 20% Compound 1 to either MPEG 350 or MPEG 550, respectively, displayed high ionic conductivity (around 10$^{-3}$ S cm$^{-1}$) over a large range of salt content. Slight precipitation of salt, a problem for other PEO based systems affecting overall battery performance, can thus be avoided.

TABLE 4

| Ionic Conductivity at 25° C. of MPEG350/Compound 1/LiTFSI Blend System | | |
| --- | --- | --- |
| Blend System MPE350/Compound 1 (weight percentage) | Ethylene Oxide/Li$^+$ (molar ratio) | σ (S cm$^{-1}$) |
| 90%/10% | 2 | 2.2 × 10$^{-3}$ |
| 80%/20% | 2 | 1.1 × 10$^{-3}$ |
| 90%/10% | 5 | 1.9 × 10$^{-3}$ |
| 80%/20% | 5 | 2.1 × 10$^{-3}$ |
| 90%/10% | 10 | 1.7 × 10$^{-3}$ |
| 80%/20% | 10 | 3.4 × 10$^{-3}$ |

TABLE 5

Ionic Conductivity at 25° C. of
MPEG550/Compound 1/LiTFSI Blend System

| Blend System MPE550/Compound 1 (weight percentage) | Ethylene Oxide/Li+ (molar ratio) | σ (S cm$^{-1}$) |
|---|---|---|
| 90%/10% | 2 | 2.4 × 10$^{-3}$ |
| 80%/20% | 5 | 1.8 × 10$^{-3}$ |
| 90%/10% | 5 | 1.8 × 10$^{-3}$ |
| 80%/20% | 10 | 2.3 × 10$^{-3}$ |
| 90%/10% | 10 | 1.2 × 10$^{-3}$ |

The electrolytes prepared from the MPEG350/Compound 1, or MPEG 550/Compound 1 form homogenous liquids with LiTFSI salt and show high ionic conductivity at 25° C.

Hence, the measurements show that such high conductivity electrolytes would be advantageous for use in electrolytic media/matrices in lithium-air or Li-ion battery applications, by enhancing battery performance through an increase in energy density, reducing the level of charge voltage required by the battery during recharging, and increasing battery life.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A compound of Formula (I), (II), or (III), wherein the Formula (I), (II), (III) compounds have the following structures

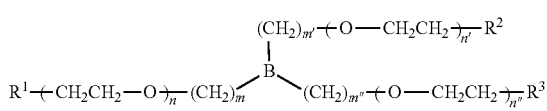

wherein

R$^1$, R$^2$, and R$^3$ are independently selected from H, C$_1$-C$_3$alkyl, allyl, cyano, amino, hydroxyl, —CO$_2$H, —CO$_2$R''' and —OCOOR'''; m, m' and m'' are integers, each independently selected from 3 to 100; n, n', and n'' are integers, each independently selected from 1 to 100; and R''' is C$_1$-C$_6$alkyl or aryl.

2. The compound of claim 1, wherein the compound is Formula (I) having the following structure

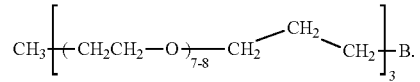

3. A composition comprising bis(trifluoromethane)sulfonamide lithium salt and the compound of claim 1, wherein the compound is Formula (I).

4. The composition of claim 3, further comprising a methoxypolyethylene glycol, said glycol having an average molecular weight from about 350 to about 750.

5. A composition comprising his (trifluoromethane)sulfonamide lithium salt and the compound of claim 2.

6. The composition of claim 5, further comprising methoxypolyethylene glycol, said glycol having an average molecular weight from about 350 to about 750.

* * * * *

UNITED STATES PATENT AND TRADEMARK OFFICE
CERTIFICATE OF CORRECTION

PATENT NO. : 10,988,489 B2
APPLICATION NO. : 16/201121
DATED : April 27, 2021
INVENTOR(S) : Khan et al.

It is certified that error appears in the above-identified patent and that said Letters Patent is hereby corrected as shown below:

In the Claims

Claim 5, at Column 18, Lines 36-37: "his (trifluoromethane)sulfonamide" should be
--bis (trifluoromethane)sulfonamide--

Signed and Sealed this
Thirty-first Day of May, 2022

Katherine Kelly Vidal
*Director of the United States Patent and Trademark Office*